United States Patent [19]

Clasen et al.

[11] Patent Number: 4,981,435
[45] Date of Patent: Jan. 1, 1991

[54] DEVICE OF QUARTZ GLASS

[75] Inventors: Rolf Clasen; Klaus Schlageter, both of Aachen, Fed. Rep. of Germany

[73] Assignee: U.S. Philips Corp., New York, N.Y.

[21] Appl. No.: 517,464

[22] Filed: Apr. 30, 1990

Related U.S. Application Data

[63] Continuation of Ser. No. 271,137, Nov. 14, 1988, abandoned.

[30] Foreign Application Priority Data

Nov. 25, 1987 [DE] Fed. Rep. of Germany ....... 3739906

[51] Int. Cl.$^5$ ............................................... F27D 1/12
[52] U.S. Cl. .................................. 432/233; 432/225; 432/226
[58] Field of Search ............... 432/224, 225, 226, 233, 432/77, 89

[56] References Cited

U.S. PATENT DOCUMENTS

| | | |
|---|---|---|
| 3,957,032 | 5/1976 | Jelesko ................................. 432/225 |
| 4,245,982 | 1/1981 | Radoux et al. ....................... 432/233 |
| 4,255,137 | 3/1981 | Guyer ................................... 432/225 |
| 4,515,562 | 5/1985 | Williams ............................. 432/226 |
| 4,516,787 | 5/1985 | Venable . | 
| 4,580,972 | 4/1986 | Hsiung ................................. 432/225 |

FOREIGN PATENT DOCUMENTS 3619510 12/1987 Fed. Rep. of Germany .

Primary Examiner—Henry C. Yuen
Attorney, Agent, or Firm—William L. Botjer

[57] ABSTRACT

A device of quartz glass for receiving or holding work pieces to be heated in a furnace, a region of the device projecting into the hot furnace zone having an arcuate part with a beginning of curvature and an end of curvature, which is enclosed by a vessel filled with an immersion liquid, heat radiation passed in the material of the device in a region located before the arcuate part due to total reflection being coupled out of the arcuate part and being coupled into the immersion liquid and a region of the device adjoining the arcuate part together with further device parts present at it being colder than the region located before the arcuate part.

9 Claims, 1 Drawing Sheet

DEVICE OF QUARTZ GLASS

This is a continuation of application Ser. No. 271,137, filed Nov. 14, 1988 now abandoned.

BACKGROUND OF THE INVENTION

The invention relates to a device of quartz glass for receiving or holding work pieces to be heated in a furnace.

In methods of purifying and sintering ceramic green bodies, such as are required, for example, for the manufacture of quartz glasses of high purity, which are required, for example, as substrate tubes for the manufacture of optical wave guides or as bulb glass for the manufacture of halogen or gas discharge lamps, or of purifying and sintering ceramic green bodies, such as are required, for example, for the manufacture of electronic elements, device parts in the form of working tubes, in which the green body to be purified is arranged and through which the purification gas flows, or in the form of holding rods, to which the purified body to be sintered is secured, are used for the heating processes during the purification and the sintering of the green bodies.

A purification and sintering method for such green bodies is proposed, for example, in German Patent Application No. P 36 19 510.3.

Such devices advantageously consist of quartz glass. These devices are inserted into an electrically heated furnace and are used at temperatures of at least up to 1500° C.

At purification temperatures above 800° C., a strongly increasing part of the furnace heat is transported by radiation to the furnace ends. With the use of quartz glass for the said devices, a large part of this radiation heat is passed within the quartz glass by multiple total reflection on account of the favourable transmission properties of quartz glass and at this area the radiation can emanate again at perpendicular intersection surfaces. The problem appears therefrom that further device parts, such as sealing rings of, for example, natural or synthetic caoutchouc, or metallic securing parts, connected to the devices of quartz glass are strongly heated. This heating by radiation cannot be reduced by cooling from the outside, for example by means of air or water. Due to the great differences between the refractive indices of quartz glass and air, the radiation once coupled in the hot furnace zone into a device part of quartz glass is passed as well as radiation in, for example, an optical wave guide and this radiation does not emanate even at bends.

SUMMARY OF THE INVENTION

The invention has for its object to construct device parts of quartz glass present in a hot furnace, such as working tubes or holding rods, so that they are not heated by heat radiation at the end at which further device parts, such as closure members or securing members, are connected to them.

According to the invention, this object is achieved in that a region of the device projecting into the hot furnace zone has an arcuate part having a beginning of curvature and an end of curvature, which is enclosed by a vessel filled with an immersion liquid, heat radiation passed in the material of the device in a region located before the arcuate part due to total reflection being coupled out of the arcuate part and being coupled into the immersion liquid and a region of the device adjoining the arcuate part together with further device parts present at it being colder than the region of the device located before the arcuate part.

According to advantageous further embodiments of the invention, the device is a holding rod, preferably having a further device part in the form of a securing member, or a working tube, preferably having a further device part in the form of a sealing ring.

According to further advantageous embodiments of the invention, an immersion liquid is used, which has a temperature coefficient of the refractive index which is similar to that of quartz glass. Preferably, thtraethylene glycol is used as immersion liquid.

With the device according to the present invention, the advantage is obtained that heat radiation passed into device parts of quartz glass can be coupled out of the quartz glass in a surprisingly simple manner.

BRIEF DESCRIPTION OF THE DRAWING

In order that the invention may be readily carried out, it will now be described more fully, by way of example, with reference to the accompanying drawing, in which.

DESCRIPTION OF THE PREFERRED EMBODIMENTS

Figure 1:
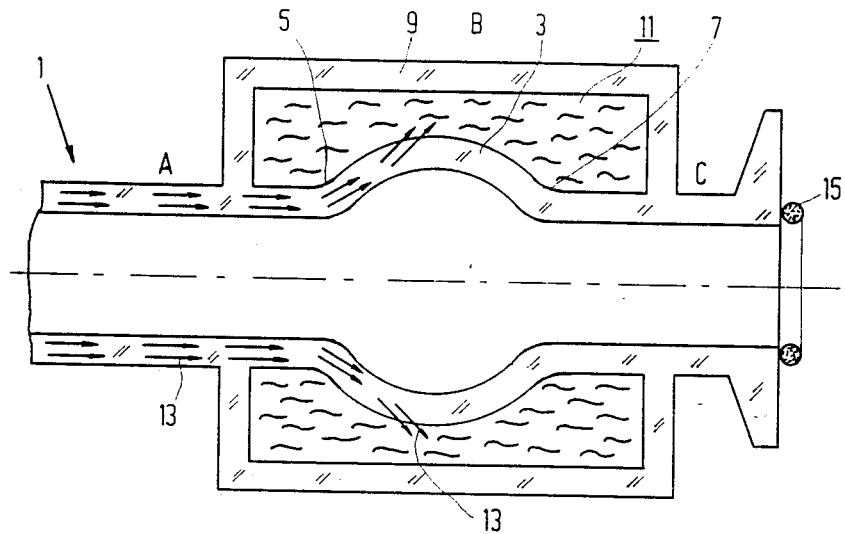
FIG. 1 shows a working tube according to the invention for purifying green bodies in sectional view.

FIG. 1 shows a device 1 in the form of a working tube of quartz glass, in which a green body of a ceramic material (not shown) can be purified by means of a flow of purification gas, for example of a carrier gas saturated with a sulphur-oxygen-halogen compound, which flows through the working tube, in a furnace at a temperature in the range of from 200° to 500° C. The working tube is located with its region A in a furnace not shown. Heat radiation 13 passed within the material of the working tube from the region A towards the region B due to total reflection is first passed on within the region A due to the favourable transmission properties of quartz glass by multiple total reflection within the material of the tube sheath. Within the region B, in which the working tube has an arcuate part 3 having a beginning of curvature 5 and an end of curvature 7, which is enclosed by a vessel 9, in which an immersion liquid 11 is present having preferably a temperature coefficient of the refractive index which is similar to that of quartz glass, the heat radiation 13 passed within the quartz glass in the region A first follows the variation of the beginning of curvature 5. Due to the immersion liquid 11 enclosing the arcuate part 3 in the region B, the heat radiation 13 is no longer reflected in the region B, but spreads rectilinearly and enters the immersion liquid 11. At latest after the end of curvature 7, the heat radiation 13 is coupled out of the quartz glass of the arcuate part 3. In the region C, the working tube is cooled to such an extend that further device parts provided at the end of the working tube, such as, for example, a sealing ring 15, are no longer heated in an undesired manner.

Figure 2:
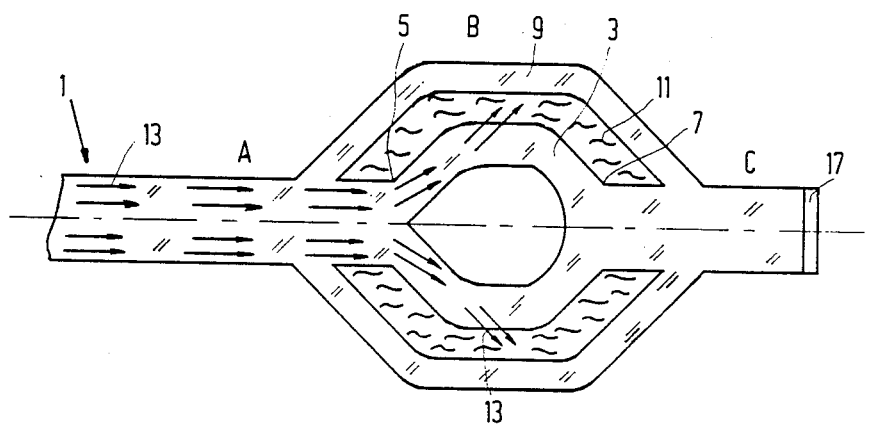
FIG. 2 shows a holding rod according to the invention for sintering green bodies in sectional view.

A further embodiment of the device 1 according to the invention in the form of a holding rod of quartz glass for ceramic green bodies to be sintered, for example, with a further device part in the form of a securing member 17 is shown in FIG. 2.

In a sintering process, green bodies secured to a holding rod, such as are required, for example, for the manufacture of preforms for optical wave guides, are passed at a lowering speed of, for example, 3 mm/min through a furnace heated to a temperature of 1500° C. The holding rod shown in FIG. 2 is solid in its region A and has in its region B an arcuate part 3 widened into the shape of a tube and having a beginning of curvature 5 and an end of curvature 7, the holding rod being enclosed at the area of the arcuate part 3 by a vessel 9, which is filled with an immersion liquid 11. In the region C, the holding rod is solid again. Heat radiation 13 passed in the quartz glass of the holding rod due to total reflection from the region A towards the region B is coupled out in the same manner as described, for example, with reference to FIG. 1. A securing member 17 provided at the end of the region C at the holding rod is thus not heated either in an undesired manner.

A device of the kind described with reference to FIG. 2 may be used not only for sintering ceramic green bodies, but also for drawing optical wave guide fibres to be obtained from a quartz glass body; in this drawing process, even considerably higher temperatures (furnace temperatures of up to about 2000° C.) are required than for sintering quartz glass bodies; in this case, the problem arises to a greater extent that securing members are heated in an undesired manner.

The vessel 9 for receiving the immersion liquid 11 shown in FIGS. 1 and 2 is efficaciously also made of quartz glass and can be fused to the device 1 in the form of a working tube or of a holding rod. However, it is also possible to flange a separate vessel to the device by means of sealing rings.

With the use of the device according to the invention in high-temperature furnaces, it is efficacious to provide for an additional cooling of the immersion liquid, especially if this liquid has a temperature coefficient of the refractive index different from that of quartz glass.

In a practical embodiment, a quartz glass tube having a length of 1.80 m, an outer diameter of 58 mm and a wall thickness of 4 mm provided with an arcuate part having an outer diameter of 74 mm was inserted into an electrically heated resistance furnace having a length of 1.50 m and an inner furnace diameter of 80 mm. At a furnace temperature of 1100° C., a sealing ring of a fluoro-elastomer present at the end of the quartz glass tube had a temperature of <50° C. when the quartz glass tube had the construction according the invention. With the use of a quartz glass tube having the same dimensions, but without an arcuate part and a vessel with immersion liquid, a sealing ring of a fluoro-elastomer was heated at the same furnace temperature to a temperature of >200° C., which led to a destruction of the sealing ring already after a short time.

What is claimed is:

1. A device of quartz glass for receiving and holding a workpiece proximate to a heated area, comprising:
    a first end for insertion into said heated area;
    a second end, distal from said first end, to which heat should be prevented from flowing;
    a heat absorbing portion disposed between said first and second ends, said heat absorbing portion including a curved portion joined to said first end for thermal transfer therethrough, a vessel disposed about said curved portion, said vessel including an immersion liquid which surrounds said heat absorbing portion, said heat being coupled by total internal reflection from said first part through said curved portion to said immersion liquid to thereby thermally insulate said second end; and
    means for attaching a workpiece to at least one of said second end and said heat absorbing portion.

2. A device as claimed in claim 1, characterized in that the device is a working tube.

3. A device as claimed in claim 2, characterized in that the further device part is a sealing ring.

4. A device as claimed in claim 1, characterized in that the device is a holding rod.

5. A device as claimed in claim 4, characterized in that the further device part is a securing member.

6. A device as claimed in claim 1, characterized in that said immersion liquid has a temperature coefficient of the refractive index which is similar to that of quartz glass.

7. A device as claimed in claim 6, characterized in that tetraethylene glycol is used as immersion liquid.

8. The device as claimed in claim 1 wherein said device includes an opening extending along the longitudinal axis of the device from said first end to said second end.

9. The device as claimed in claim 1 wherein said heat absorbing portion includes a centrally disposed opening.

* * * * *